United States Patent [19]

Ramanathan

[11] 4,179,435
[45] Dec. 18, 1979

[54] AZO DYESTUFFS HAVING A CARBOXYL GROUP AND A SUBSTITUTED SULFONYLIMINO GROUP IN THE COUPLING COMPONENT

[75] Inventor: Visvanathan Ramanathan, Basel, Switzerland

[73] Assignee: Ciba-Geigy Corporation, Ardsley, N.Y.

[21] Appl. No.: 918,209

[22] Filed: Jun. 22, 1978

Related U.S. Application Data

[60] Division of Ser. No. 723,120, Sep. 14, 1976, Pat. No. 4,115,381, which is a continuation of Ser. No. 485,054, Jul. 1, 1974, abandoned, which is a continuation of Ser. No. 243,469, Apr. 12, 1972, abandoned.

[30] Foreign Application Priority Data

May 3, 1971 [CH]  Switzerland .................... 6468/71

[51] Int. Cl.$^2$ .................. C09B 29/08; C09B 29/26; C09B 29/36; D06P 3/52
[52] U.S. Cl. .................. 260/158; 260/152; 260/155; 260/156; 260/157; 260/162; 260/163; 562/437
[58] Field of Search .............. 260/152, 158, 157, 156, 260/162, 163

[56] References Cited

U.S. PATENT DOCUMENTS

| 2,314,440 | 3/1943 | Bock et al. ............... 260/158 X |
| 2,406,004 | 8/1946 | Dickey et al. ............ 260/205 |
| 2,955,901 | 10/1960 | Kruckenberg ............ 260/158 |
| 3,268,507 | 8/1966 | Kruckenberg ............ 260/207 |
| 3,329,669 | 7/1967 | Sartori ..................... 260/158 |
| 3,335,125 | 8/1967 | Illy ........................... 260/158 |
| 3,342,804 | 9/1967 | Mueller .................... 260/207.1 |
| 3,405,118 | 10/1968 | Sartori ..................... 260/158 |
| 3,586,663 | 6/1971 | Kruckenberg ............ 260/207.1 |
| 3,625,938 | 12/1971 | Kubba ...................... 260/205 |
| 3,652,584 | 3/1972 | Wegmuller ............... 260/207 |

FOREIGN PATENT DOCUMENTS 1012239 12/1965 United Kingdom ............ 260/207.1
1202984  8/1970 United Kingdom ............ 260/158

Primary Examiner—Floyd D. Higel
Attorney, Agent, or Firm—Michael W. Glynn

[57] ABSTRACT

Dyestuffs of the formula

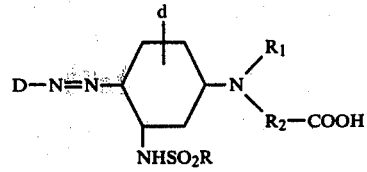

wherein
D is a heterocyclic diazo component,
$R_1$ is an alkyl radical which may be substituted,
$R_2$ is phenylene or alkylene
d is hydrogen, chloro, lower alkyl, lower alkoxy, aryl, aryloxy or arylmercapto, and
R is an optionally substituted alkyl, aryl or amino group, dye polyester fibers in red and blue shades with good fasteners, and are suitable for use in the thermosol process.

6 Claims, No Drawings

AZO DYESTUFFS HAVING A CARBOXYL GROUP AND A SUBSTITUTED SULFONYLIMINO GROUP IN THE COUPLING COMPONENT

This is a division of application Ser. No. 723,120, filed on Sept. 14, 1976, now U.S. Pat. No. 4,115,381, which is a continuation of application Ser. No. 485,054, filed July 1, 1974, now abandoned, which is turn is a continuation of application Ser. No. 243,469, filed Apr. 12, 1972, now abandoned.

The present invention relates to valuable, new azo compounds which are free from sulphonic acid and have the formula

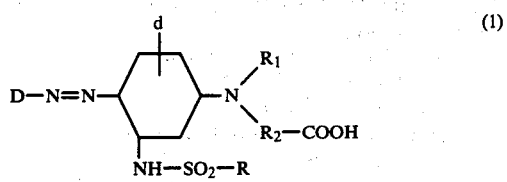

wherein D is the radical of a diazo component, $R_1$ is a hydrogen atom or an optionally substituted alkyl radical, $R_2$ represents an optionally substituted arylene radical or preferably an optionally substituted alkylene radical, R is an optionally substituted alkyl or aryl radical or a radical of the formula

wherein $R_3$ and $R_4$ are each alkyl groups or together with the nitrogen atom form a 5- or 6-membered ring which is optionally interrupted by a hetero atom, and d is a hydrogen atom, a chlorine atom, a lower alkyl, alkoxy radical or an aryl, aryloxy or arylmercapto radical, and the radical of the coupling component to the right of the —N=N—group contains only one group of the formula —CO—OR$_5$, wherein $R_5$ is a hydrogen atom or an alkyl radical.

According to the invention, the compounds are obtained by coupling a diazonium compound of a diazo component with a coupling component of the formula

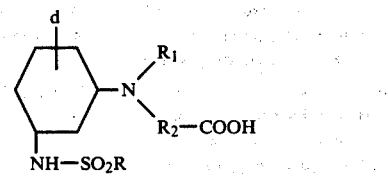

Interesting dyestuffs are those of the formula

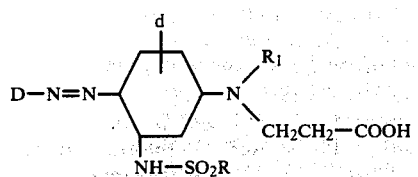

and those of the formula

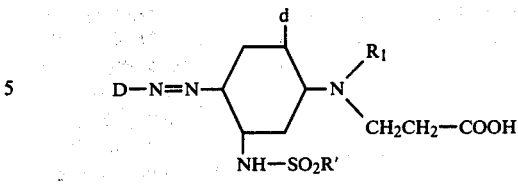

wherein R' is a lower alkyl group.

The radical d preferably represents a hydrogen atom, a lower alkyl or alkoxy radical, such as the methyl, ethyl, methoxy or ethoxy radical, also a phenyl, phenylthio or phenoxy radical.

The group $R_1$ represents a hydrogen atom or a lower alkyl group (i.e. containing from 1 to 4 carbon atoms), such as methyl, ethyl, propyl or butyl groups, or a substituted alkyl group i.e. substituted methyl, ethyl, n-propyl, isopropyl or butyl groups, for example phenylalkyl groups, such as benzyl or β-phenylethyl groups halogenated alkyl groups, such as β-chloroethyl β,β,β-trifluoroethyl and β,γ-dichloropropyl groups, and β-cyanoethyl groups; cyanoethoxyethyl; β-hydroxyethyl-; alkoxyalkyl-, such as β-ethoxyethyl-, δ-methoxybutyl- or δ-butoxybutyl; acylaminoalkyl groups, such as β-(acetyl- or formyl)-aminoethyl, benzoylaminoethyl or dodecylcarbonylaminoethyl groups; acyloxyalkyl groups, such as β-formyloxyethyl, β-acetyloxyethyl, β,γ-diacetoxypropyl, γ-butyryloxypropyl, benzoyloxybutyl, decylcarbonyloxyethyl, dodecylcarbonyloxyethyl and their chlorinated or brominated $C_1$-$C_5$ derivatives, such as chloroacetyloxyethyl and α,β-dibromopropionyloxyethyl groups; β-arylsulphonylalkyl groups, such as β-phenylsulphonylethyl, β-(p-toluenesulphonyl)-ethyl or β-(p-chlorobenzenesulphonyl)-ethyl, β-(p-toluenesulphonyl)-ethyl groups; alkyl or arylcarbamoyloxyalkyl groups, such as β-methylcarbamyloxyethyl, butylcarbamyloxy, dodecylcarbamyloxy and β-(methoxy, ethoxy or isopropyloxy)-carbonyloxyethyl, aryloxycarbonyloxy, such as phenoxycarbonyloxy, β-(p-hydroxyphenoxy)-ethyl, β-phenoxyethyl, β-toluyloxyethyl, β-acetylethyl, β-cyanoacetoxyethyl, and β-(p-alkoxy- or phenoxybenzoyl)-oxyethyl groups; The groups $R_1$ and $R_2$ contain in general not more than 18, but preferably not more than 10 carbon atoms.

The radical $R_2$ is an optionally substituted phenylene radical or preferably a straight-chain or branched alkylene group containing from 1 to 4 carbon atoms, for example one of the radicals

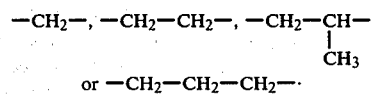

Of the optional diazotisable amines which are free from water-solubilising groups and are suitable as the diazo component D-NH$_2$, special mention may be made of those amines which have a heterocyclic 5-membered ring containing 2 or 3 hetero atoms, primarily a nitrogen atom and one or two sulphur, oxygen or nitrogen atoms as hetero atoms, as well as aminobenzenes.

Preferred heterocyclic diazo components belong to the series of the thiazoles, benzthiazoles, isothiazoles, benzisothiazoles, 1,3,4-thiadiazoles, 1,3,5-thiadiazoles, pyrazoles, indazoles, pyridines or thiophenes.

Preferably D represents a phenyl radical which is optionally substituted by chlorine or bromine atoms, hydroxyl, cyano, thiocyanogen-, nitro, methyl, ethyl, trifluoromethyl, methoxy, ethoxy, formyl, acetyl, propionyl, benzoyl, methylbenzoyl, methoxycarbonyl, ethoxycarbonyl, ethoxycarbonyloxy, benzyloxycarbonyloxy, acetoxy, propionyloxy, benzoyloxy, methoxyethoxycarbonyl, acetylamino, propionylamino, benzoylamino, methoxycarbonylamino, ethoxycarbonylamino, methylsulphonyl, ethylsulphonyl, propylsulphonyl, butylsulphonyl, chloromethylsulphonyl-, aminosulphonyl, methylaminosulphonyl, dimethylaminosulphonyl, di-(hydroxyethyl)-aminosulphonyl, cyclohexylaminosulphonyl, phenylaminosulphonyl, chlorophenylaminosulphonyl, methoxyphenylaminosulphonyl, benzylaminosulphonyl, N-piperidylsulphonyl-, N-morpholinosulphonyl, methylsulphonyloxy, ethylsulphonyloxy, ethoxyethylsulphonyloxy, propylsulphonyloxy, hexylsulphonyloxy, cyclohexylsulphonyloxy, chloromethylsulphonyloxy, cyanoethylsulphonyloxy, phenylsulphonyloxy, chlorophenylsulphonyloxy, aminosulphonyloxy, N-morpholinosulphonyloxy-, methoxyphenylsulphonyloxy, ethyleneiminosulphonyloxy, methylaminosulphonyloxy, ethylaminosulphonyloxy, propylaminosulphonyloxy, butylaminosulphonyloxy, dimethylaminosulphonyloxy, diethylaminosulphonyloxy, dipropylaminosulphonyloxy, dibutylaminosulphonyloxy, phenylaminosulphonyloxy, N-phenyl-N-methylaminosulphonyloxy, N-phenyl-N-ethylaminosulphonyloxy, methoxyphenylaminosulphonyloxy, phenylamino, nitrophenylamino, dinitrophenylamino, phenyl-, acetylaminophenyl, phenylaminosulphonylphenyl, phenylazo or nitrophenylazo groups, a naphthyl radical which is optionally substituted by methoxy, ethoxy, phenylazo or dimethylaminosulphonyl groups, a thiazolyl radical which is optionally subsituted by chlorine or bromine atoms, nitro, cyano, thiocyano, lower alkyl, lower aralkyl, phenyl, lower cyanoalkyl, lower alkoxy, lower alkoxycarbonyl, trifluoromethyl, lower alkylcarbonyl or lower alkylsulphonyl groups, a benzthiazole radical which is optionally substituted by chlorine or bromine atoms, cyano, thiocyano, lower alkyl, lower alkoxy, lower araloxy, phenyl, lower alkylmercapto, lower alkylsulphonyl, trifluoromethyl, nitro, cyanoethylsulphonyl, optionally, mono- and dialkylated aminosulphonyl or lower alkoxycarbonyl groups, a pyrazolyl radical which is optionally substituted by cyano, lower alkyl, lower alkoxy, lower alkoxycarbonyl or phenyl groups, a thiadiazolyl radical which is optionally substituted by chlorine or bromine atoms, lower alkoxy, alkylmercapto, lower alkyl, lower alkylsulphonyl, phenyl, methylthiophenyl, nitrophenyl, tolyl, chlorophenyl or bromophenyl groups, an imidazolyl radical which is optionally substituted by nitro or lower alkyl groups, a thienyl radical which is optionally substituted by nitro, lower alkoxycarbonyl, lower alkyl, lower alkylsulphonyl, acetyl or optionally alkylated aminosulphonyl groups, an isothiazolyl radical which is optionally substituted by alkyl, phenyl or cyano, groups, a benzisothiazolyl radical which is optionally substituted by lower alkyl or nitro groups or bromine or chlorine atoms, or a pyridine radical which is substituted by lower alkyl groups, cyano groups, bromine or chlorine atoms.

A valuable selection of diazo components is also represented by the negatively substituted aminobenzenes, for example those of the formula

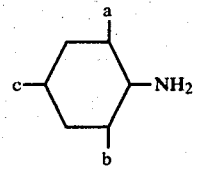

wherein a represents a hydrogen or halogen atom, an alkyl or alkoxy, nitro, cyano, carbalkoxy or alkylsulphonyl group, b represents a hydrogen or halogen atom, an alkyl, cyano or alkylsulphonyl group.

Negatively substituted anilines are those which contain negative substituents, i.e. substituents which intensify the acid properties of phenol or possess a positive sigma value (Hammet).

As examples there may be cited:
2-aminothiazole,
2-amino-5-nitrothiazole,
2-amino-5-methylsulphonyl-thiazole,
2-amino-5-cyanothiazole,
2-amino-4-methyl-5-nitrothiazole,
2-amino-4-methylthiazole,
2-amino-4-phenylthiazole,
2-amino-4-(4'-chloro)-phenylthiazole,
2-amino-4-(4'-nitro)-phenylthiazole,
3-aminopyridine,
3-aminoquinoline,
3-aminopyrazole,
3-amino-1-phenylpyrazole,
3-aminoindazole,
3-amino-1,2,4-triazole,
5-(methyl-, ethyl-, phenyl- or benzyl)-1,2,4-triazole,
3-amino-1-(4'-methoxyphenyl)-pyrazole,
2-aminobenzthiazole,
2-amino-6-methylbenzthiazole,
2-amino-6-methoxybenzthiazole,
2-amino-6-chlorobenzthiazole,
2-amino-6-cyanobenzthiazole,
2-amino-6-thiocyanobenzthiazole,
2-amino-6-nitrobenzthiazole,
2-amino-6-carboethoxybenzthiazole,
2-amino-(4- or 6)-methylsulphonylbenzthiazole,
2-amino-1,3,4-thiadiazole
2-amino-1,3,5-thiadiazole,
2-amino-4-phenyl- or -4-methyl-1,3,5-thiadiazole,
2-amino-5-phenyl-1,3,4-thiadiazole,
2-amino-3-nitro-5-methylsulphonyl-thiophene,
2-amino-3,5-bis-(methylsulphonyl)-thiophene,
5-amino-3-methyl-isothiazole,
2-amino-4-cyano-pyrazole,
2-(4'-nitrophenyl)-3-amino-4-cyanopyrazole,
3- or 4-aminophthalimide,
aminobenzene,
1-amino-4-chlorobenzene,
1-amino-4-bromobenzene,
1-amino-4-methylbenzene,
1-amino-4-nitrobenzene,
1-amino-4-cyanobenzene,
1-amino-2,5-dicyanobenzene,
1-amino-4-methylsulphonylbenzene,
1-amino-4-carbalkoxybenzene,
1-amino-2,4-dichlorobenzene,
1-amino-2,4-dibromobenzene,
1-amino-2-methyl-4-chlorobenzene,
1-amino-2-trifluoromethyl-4-chlorobenzene,
1-amino-2-cyano-4-chlorobenzene, 1-amino-2-carbomethoxy-4-chlorobenzene,
1-amino-2-carbomethoxy-4-nitrobenzene,
1-amino-2-chloro-4-cyanobenzene
1-amino-2-chloro-4-nitrobenzene,
1-amino-2-bromo-4-nitrobenzene,
1-amino-2-chloro-4-carboethoxybenzene,
1-amino-2-chloro-4-methylsulphonylbenzene,
1-amino-2-methylsulphonyl-4-chlorobenzene,
1-amino-2,4-dinitro-6-methylsulphonylbenzene,
1-amino-2,4-dinitro-6-(2'-hydroxyethylsulphonyl)-benzene,
1-amino-2,4-dinitro-6-(2'-chloroethylsulphonyl)-benzene,
1-amino-2-methylsulphonyl-4-nitrobenzene,
1-amino-2-methylsulphinyl-4-nitrobenzene,
1-amino-2,4-dinitrobenzene,
1-amino-2,4-dicyanobenzene,
1-amino-2-cyano-4-methylsulphonylbenzene,
1-amino-2,6-dichloro-4-cyanobenzene,
1-amino-2,6-dichloro-4-nitrobenzene,
1-amino-2,4-dicyano-6-chlorobenzene,
4-aminobenzoic acid cyclohexyl ester,
1-amino-2,4-dinitro-6-chlorobenzene and in particular
1-amino-2-cyano-4-nitrobenzene,
1-aminobenzene-2, -3- or -4-sulphonic acid amides, for example
N-methyl- or N,N-dimethyl- or -diethylamide,
N,γ-isopropyloxypropyl-2-amino-naphthalene-6-sulphonic acid amide,
N,γ-isopropyloxypropyl-1-aminobenzene-2, -3- or -4-sulphonic acid amide,
N-isopropyl-1-aminobenzene-2-, -3- or -4-sulphonic acid amide,
N,γ-methoxypropyl-1-aminobenzene-2-, -3- or -4-sulphonic acid amide,
N,N-bis-(β-hydroxyethyl)-1-aminobenzene-2-, -3- or -4-sulphonic acid amide,
1-amino-4-chlorobenzene-2-sulphonic acid amide,
and the N-substituted derivatives,
2-, 3- or 4-aminophenylsulphamate,
2-amino-4, -5- or -6-methylphenylsulphamate,
2-amino-5-methoxy-phenylsulphamate,
3-amino-6-chlorophenylsulphamate,
3-amino-2,6-dichlorophenylsulphamate,
4-amino-2- or -3-methoxyphenylsulphamate,
N,N-dimethyl-2-aminophenylsulphamate,
N,N-di-n-butyl-2-aminophenylsulphamate,
N,N-dimethyl-2-amino-4-chlorophenylsulphamate,
N,n-propyl-2-aminophenylsulphamate,
N,N-di-n-butyl-3-aminophenylsulphamate,
O(3-aminophenyl)-N-morpholine-N-sulphonate,
O(3-aminophenyl)-N-piperidine-sulphonate,
N-cyclohexyl-O-(3-aminophenyl)-sulphamate,
N(N-methylaniline)-O-(3-aminophenyl)-sulphonate,
N,N-diethyl-3-amino-6-methylphenyl-sulphamate,
N-ethyleneimine-O-(4-aminophenyl)-sulphonate,
N,N-dimethyl-4-aminophenylsulphamate,
O(n-propyl)-O-(3-aminophenyl)-sulphonate,
O,β-chloroethyl-O-(2-aminophenyl)-sulphonate,
O-benzyl-O-(3-aminophenyl)-sulphonate and
O-ethyl-O-(4-amino-2,6-dimethyl-phenyl)-sulphonate.
Examples of
4-aminobenzenes which may be used as diazo components are:
4-aminoazobenzene,
3,2-dimethyl-4-aminoazobenzene,
2-methyl-5-methoxy-4-aminoazobenzene,
4-amino-2-nitroazobenzene,
2,5-dimethoxy-4-aminoazobenzene,
4'-methoxy-4-aminoazobenzene,
2-methyl-4'-methoxy-4-aminoazobenzene,
3,6,4'-trimethoxy-4-aminoazobenzene,
4'-chloro-4-aminoazobenzene,
2'- or 3'-chloro-4-aminoazobenzene,
3-nitro-4-amino-2',4'-dichloroazobenzene and
4-aminoazobenzene-4'-sulphonic acid amide.

Instead of the above cited diazo components that are free from ionogenic water-solubilising groups, it is also possible to use those that contain fibre reactive groups such, for example, as s-triazinyl radicals that carry 1 or 2 chlorine or bromine atoms on the triazine ring, pyrimidyl radicals that carry 1 or 2 arylsulphonyl or alkanesulphonyl groups on the pyrimidine ring, mono-, or bis-(γ-halogeno-β-hydroxypropyl)-amino groups, β-halogeno-ethylsulphamyl radicals, β-halogeno-ethoxy groups, β-halogeno-ethylmercapto groups, 2-chloro-benzthiazolyl-6-azo groups, 2-chlorobenzthiazolyl-6-amino groups, γ-halogeno-β-hydroxy-propylsulphamyl radicals, chloroacetylamino groups, α,β-dibromopropionyl groups, vinylsulphonyl groups and 2,3-epoxypropyl groups.

Suitable fibre reactive diazo components are, for example:
N,β-chloroethyl-3-chloro-4-amino-benzenesulphamide (hydrochloride),
N,β-chloroethyl-4-aminobenzene-sulphamide (hydrochloride) 3-bromo-4-amino-ωchloroacetophenone,
N,γ-chloro-β-hydroxypropyl-4-aminobenzene-sulphamide,
N,β-chloroethyl-1-amino-4-naphthylsulphonamide,
N,β-chloroethyl-1-amino-3,5-dichloro-benzenesulphamide and 4-(γ-chloro-β-hydroxy-propoxy)aniline.

The compounds manufactured with such diazo components contain instead of the fibre-reactive acylamino group Ac, which is present according to the invention, an additional fibre-reactive group whose reactivity may be greater or lesser than that of the group Ac.

The diazotisation of the cited diazo components can take place in known manner, for example with the aid of mineral acid and sodium nitrite or, for example, with a solution of nitrosylsulphuric acid in concentrated sulphuric acid.

The coupling can likewise be carried out in known manner, for example in neutral to acid medium, optionally in the presence of sodium acetate or similar buffer substances or catalysts that influence the coupling speed, for example dimethylformamide, pyridine or its salts.

The coupling components can be manufactured as follows:

(1) Coupling component of the type having the formula

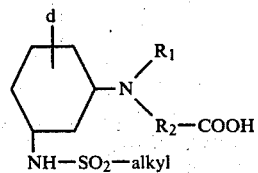

The coupling components are obtained by reacting a 3-alkylsulphonylaminoaniline with acrylic acid or with a ω-halogenocarboxylic acid, for example β-bromopropionic acid or chloroacetic acid.

To manufacture the 3-alkylsulphonylaminoanilines, m-nitroaniline is acylated with one of the sulphonic acids or halides thereof listed hereunder, and the nitro group is reduced with iron/hydrochloric acid or catalytically with Raney nickel to the amino group.

Suitable sulphonic acids of the formula $R-SO_3H$ are:
methanesulphonic acid
ethanesulphonic acid
n-propanesulphonic acid
n-butanesulphonic acid
isopentanesulphonic acid
allylsulphonic acid
vinylsulphonic acid
β-methallylsulphonic acid
β-methoxyethanesulphonic acid
β-ethoxyethanesulphonic acid
β-butoxyethanesulphonic acid
chloro- or bromomethanesulphonic acid
α-chlorovinylsulphonic acid
benzenesulphonic acid
p-toluenesulphonic acid
p-chlorosulphonic acid
and benzylsulphonic acid.

The sulphonic acids may be used in the form of their chlorides or bromides for the acylation.

(2) The coupling component of the type having the formula

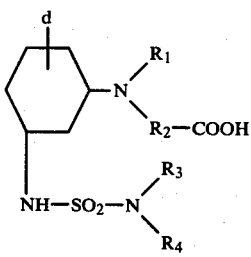

is obtained by reacting m-nitro-aniline with dialkylaminosulphonic chlorides, hydrogenating the nitro group and introducing the carboxyl group as described hereinabove. Suitable sulpho chlorides are those of the formula

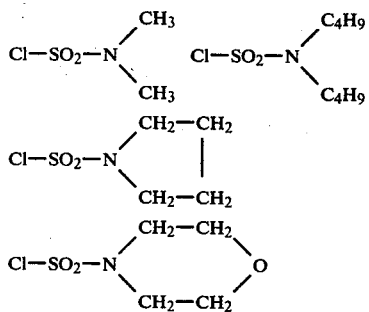

If the coupling components described above under (1) or (2) are monovalent organic acids, they contain only one N—alkyl—CO—O group; if they are divalent acids, they contain two N—alkyl—CO—O groups.

The new compounds, their mixtures with one another and their mixtures with other azo dyestuffs are outstandingly suitable for dyeing and printing leather, wool, silk and above all synthetic fibres, for example, acrylic or acrylonitrile fibres of polyacrylonitrile or of copolymers, of acrylonitrile and other vinyl compounds, such as acrylic esters, acrylamides, vinylpyridine, vinyl chloride or vinylidene chloride, copolymers of dicyanoethylene and vinyl acetate as well as acrylonitrile block copolymers, fibres of polyurethanes, polypropylene fibres such as, cellulose triacetate and cellulose 2½-acetate and especially fibres of polyamides, such as nylon 6, nylon 6,6 or nylon 12, and of aromatic polyesters, such as those from terephthalic acid and ethylene glycol or 1,4-dimethylcyclohexane, and copolymers of terephthalic acid and isophthalic acid and ethylene glycol.

For dyeing in aqueous liquors, the water-insoluble dyestuffs are appropriately used in a finely divided form, and dyeing is carried out with addition of dispersing agents, such as sulphite cellulose waste lye or synthetic detergents, or of a combination of different wetting agents and dispersing agents. As a rule it is advisable to convert the dyestuffs to be used, before dyeing, into a dyeing preparation which contains a dispersing agent and finely divided dyestuff in such a form that on dilution of the dyestuff preparations with water a fine dispersion is produced. Dyestuff preparations can be obtained in known manner, for example by grinding the dystuff dry or wet with the addition of textile auxiliaries, for example dispersants, during the grinding process, or by grinding with solvents, such as sulpholane or dimethyl formamide.

In order to achieve intense dyeings on polyethylene terephthalate fibres, it provides advisable to add a swelling agent to the dyebath, or to carry out the dyeing process under pressure at temperature above 100° C., for example at 120° C. Suitable swelling agents are aromatic carboxylic acids, for example salicylic acid, phenols, such as, for example, o- or p-hydroxydiphenyl, aromatic halogen compounds, such as o-dichlorobenzene, or diphenyl.

For thermofixing the dyestuff, the padded polyester fabric is heated, appropriately after prior drying, for example in a warm stream of air, to temperatures of above 100° C., for example between 180° and 210° C., or treated with superheated steam.

The dyeings obtained according to the present process can be subjected to an after-treatment, for example by heating with an aqueous solution of a non-ionic detergent.

Instead of being applied by impregnation, the compounds indicated can, according to the present process, also be applied by printing. For this purpose, for example, a printing ink is used which contains the finely disperse dyestuff in addition to the auxiliaries customary in printing, such as wetting agents and thickeners.

The present process yields powerful dyeings and prints of good fastness properties.

The new water-insoluble compounds can also be used for spin-dyeing polyamides, polyesters and polyolefins. The polymer to be dyed is appropriately mixed in the form of powder, granules or chips, as a ready-to-use spinning solution or in the fused state, with the dyestuff, which is introduced in the dry state or in the form of a dispersion or solution in a solvent, which may be volatile. After homogeneous distribution of the dyestuff in the solution or melt of the polymer, the mixture is converted into fibres, yarns, monofilaments, films and the like in a known manner, by casting, pressing or extrusion.

The new dyestuffs are also suitable for the multicolour printing of textile materials consisting of hydrophobic, synthetic, organic fibres which are free from amino groups, because it is possible to achieve with them resist effects on textile materials of such fibres. The procedure to be followed is that the material is padded with the new dyestuffs which contain carboxyl groups, the padded material is dried, printed with an alkaline printing paste containing fluorescent whitening agents which are free from carboxyl groups, white pigments or other colouring agents which are free from carboxyl groups, the fabric is fixed with the application of heat and subsequently the salt of the dyestuff containing carboxyl groups is washed out of the printed areas.

As examples of synthetic fibres which may be dyed or printed in this manner there may be mentioned: acrylic fibres, fibres of polyurethanes, polyepoxy based fibres or polyolefine fibres, for example polypropylene, in particular polypropylene modified with nickel or unmodified polypropylene, and above all, fibres of aromatic polyesters, such as those from terephthalic acid and ethylene glycol or 1,4-dimethylolcyclohexane and from copolymers of terephthalic acid and isophthalic acid and ethylene glycol, also cellulose triacetate and cellulose 2½-acetate. The fibres to be printed may not contain any amino groups.

Also possible are blended fabrics of the above mentioned fibres and hydrophilic fibres, in particular cellulose fibres. Mention may also be made of polyester/cotton blends.

The textile materials are as a rule woven fabrics, knitted fabrics, or other sheet materials such as nonwovens.

The new dyestuffs which contain carboxyl groups may be in the form of salts of volatile organic bases or ammonium salts.

As a rule, the padding liquor is aqueous. In addition to the dyestuff, it may also contain, if required, further auxiliaries, such as sodium salts of highly concentrated naphthalenesulphonic acid/formaldehyde resins, sulphite cellulose lye products, condensation products of higher molecular weight alcohols with ethylene oxide, polyglycol ethers of fatty acid amides and alkylphenols, sulphosuccinic acid ester of Turkey red oil. However, the padding liquor may also be a solution of the dyestuff.

After the textile material has been squeezed out to 20-200% by weight of the weight of the fibre, it is dried. The drying may be performed, for example, with steam or preferably with a flow of warm air between 70° and 150° C. for 10 to 300 seconds.

Subsequently the fabric is printed with an alkaline printing paste which contains a heat-resistant alkaline compound, for example an alkali carbonate, such as sodium carbonate or potassium carbonate or, above all, alkali hydroxides such as sodium or potassium hydroxide. The amount of alkali must be so gauged that the dyestuff present on the fibre is converted with certainty into the alkali salt. If the resist remains white, the resist paste may contain white pigments such as titanium dioxide or zinc oxide. In addition, the printing pastes contain the conventional additives, such as thickeners, for example gum arabic or methyl cellulose.

To achieve two-colour prints, alkali-resistant dyestuffs, in particular disperse dyestuffs, for example those listed in the Colour Index, are added to the printed paste. These dyestuffs may not contain any carboxyl groups.

Furthermore, it is also possible to introduce into the alkaline printing paste fluorescent whitening agents which have affinity for the organic fabric (for example nylon and, above all, cellulose acetate and polyester fabrics).

In addition to a disperse dyestuff which is free from carboxyl groups, the printing paste may also contain dyestuffs of other dyeing categories, for example water-soluble or water-insoluble dyestuffs with fibre-reactive groups, sich as di- or monochlorotriazine groups, chloroacetylamino groups and acrylic amide groups. The use of water-soluble, fibre reactive dyestuffs is of particular interest in those cases where blended fabrics which contain cellulose are used as substrate, in particular blended fabrics with polyester fibres. If printing pastes are used with fibre-reactive dyestuffs, the alkali treatment can be adapted to the modern methods for fixing reactive dyestuffs (alkali shock treatment).

In addition, fluorescent whitening agents are also suitable for the printing. After the printing, the textile material can be dried with steam or hot air or subjected direct to the fixing operation. The fixing of the dyestuff (or dyestuffs) on the textile material takes place with the application of heat at 100° to 260° C., preferably at 150° to 230° C., but in the case of polymers with a low softening point at lower temperatures, preferably with dry heat (thermosol process) in appliances suitable for the purpose. It is also possible to use superheated steam. Prints on polypropylene are thermofixed at temperatures below 140° C.

After the fixing process the printed material is washed. The washing can be carried out both in organic and, preferably, aqueous liquor. The conventional surfactants or detergents are used for this purpose.

The following Examples illustrate the invention, the parts and percentages being by weight unless otherwise stated.

EXAMPLE I 3.8 Parts of sodium nitrite are dissolved in 70 parts of sulphuric acid monohydrate. At approx. 10° C., 8.65 parts of 2-chloro-4-nitro-aniline are added and the mixture is stirred for 2 hours and poured on 300 parts of ice water. The resulting diazo solution is added at 0° to 5° C. to a solution of 12.9 parts of 2-3'-methanesulphonamidophenyl aminopropionic acid in 100 parts of alcohol. The mixture is further stirred for 4 hours. The precipitated dyestuff is filtered off and washed with water until the washings show a neutral reaction. The resulting dyestuff of the formula

dyes polyester and cellulose acetate fibres in red shades having very good fastness properties.

The coupling component is obtained by reacting 3-methanesulphonamidoaniline with acrylic acid.

EXAMPLE 2

1.5 Parts of sodium nitrite are sprinkled 18 parts of concentrated sulphuric acid at 0°–15° C. The mixture is heated to 65° C. until everything has dissolved, then cooled to 0° C., and 20 parts by volume of a mixture of glacial acetic acid and propionic acid in the ratio 4:1 is added dropwise. To the resulting solution is added dropwise a solution of 2.9 parts of 2-amino-5-nitrothiazole in 20 parts by volume of a mixture of glacial acetic acid and propionic acid (4:1) and the reaction mixture is further stirred for 3 hours at 0°–5° C. To this diazo solution are added 1.5 parts of urea in small amounts. The so obtained diazo solution is added at 0° C. to 5° C. to a solution of 5.76 parts of 2- 3'-methanesulphonamido-6-methoxyphenyl aminopropionic acid in 70 parts of alcohol. The mixture is further stirred for 10 hours and then diluted with water. The precipitated dyestuff is filtered off and washed with water until the washings show a neutral reaction. The resulting dyestuff of the formula

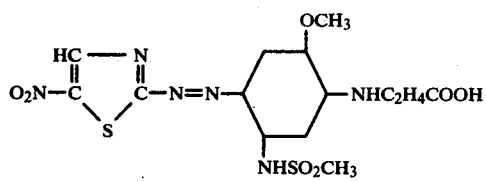

dyes polyester and cellulose fibres in blue shades having very good fastness properties.

EXAMPLE 3

3.54 Parts of 5-amino-3-phenyl-1,2,4-thiadiazole are dissolved in 20 parts by volume of formic acid. At 0° to 5° C., 1.4 parts of sodium nitrite are added and rinsed for 30 minutes. Then 0.05 parts of sulphamic acid are added. Subsequently 5.44 parts of 2- 3'-ethanesulphonamidophenyl aminopropionic acid are added and rinsed with 3 parts by volume of formic acid. The mixture is slowly heated to 60° C. and stirred at this temperature for 2 hours. The paste is diluted with 300 parts of water, thoroughly stirred, filtered with suction and the filter cake washed with water, to give the dyestuff of the formula

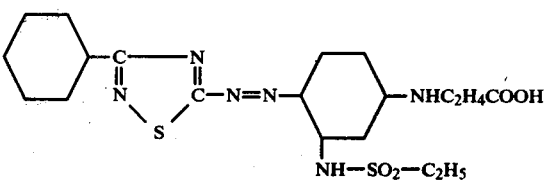

which dyes polyester fibres in red shades having very good fastness properties.

If the diazo components listed in column I are coupled with the coupling components listed in column II, dyestuffs are obtained which dye polyester fibres in the shades indicated in column III.

| | I | II | III |
|---|---|---|---|
| 1 | 2-cyano-4-nitro aniline | ⌬–NHC₂H₄COOH, NHSO₂CH₃ | bluish red |
| 2 | 3-amino-2,5-dichlorobenzene-sulphonedimethylamide | ⌬–NHC₂H₄COOH, NHSO₂CH₃ | scarlet |
| 3 | 4-amino-6-nitro-benzthiazole | ⌬–NHC₂H₄COOH, NHSO₂CH₃ | red |
| 4 | 3-amino-5-nitro-2,1-benzisothiazole | ⌬–NHC₂H₄COOH, NHSO₂CH₃ | blue |
| 5 | 4-aminobenzoic acid benzyl ester | ⌬–NHCH₂COOH, NHSO₂CH₂H₅ | orange |
| 6 | 2-amino-5-methyl-sulphonylthiazole | ⌬–NHC₂H₄COOH, NHSO₂CH₄H₉ | violet |

-continued

| I | II | III |
|---|---|---|
| 7 4-nitro-2-tri-fluoromethylaniline | 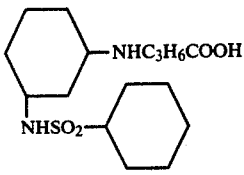 | red |
| 8 2,4-dicyanoaniline | 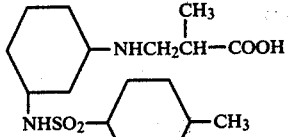 | scarlet |
| 9 4-nitroaniline | 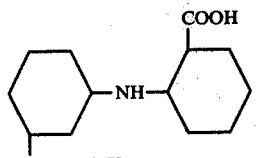 | scarlet |
| 10 2-bromo-4-nitro-aniline | 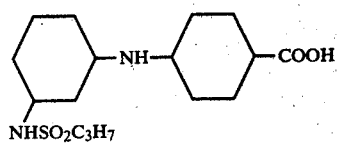 | red |
| 11 2-amino-5-acetyl-thiazole |  | violet |
| 12 2-methoxy-4-nitroaniline | 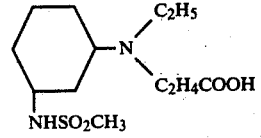 | " |
| 13 2,6-dicyano-4-nitroaniline | " | reddish blue |
| 14 2-amino-6-methyl-sulphonyl-benz-thiazole | 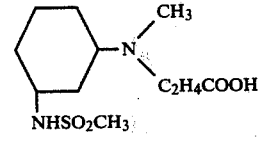 | red |
| 15 2-methyl-4-nitro-aniline | 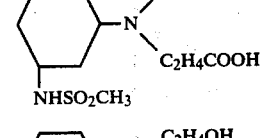 | scarlet |
| 16 2-amino-6-dimethyl-amino-sulphonyl-benzthiazole | 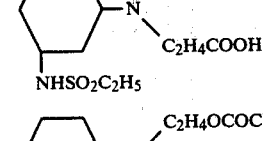 | red |
| 17 2-nitro-4-phenyl-azoaniline | 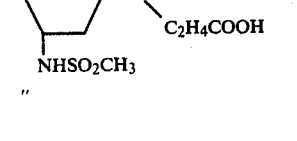 | " |
| 18 4-amino-3-chloro-benzene-sulphon-amide | " | scarlet |
| 19 2-amino-6-cyano-benzthiazole | " | red |

-continued

| | I | II | III |
|---|---|---|---|
| 20 | 2-amino-5-nitro-benzoic acid-methyl ester | benzene ring with N(C2H4OCH3)(C2H4COOH) and NHSO2CH3 | " |
| 21 | 2-bromo-6-cyano-4-nitroaniline | " | claret |
| 22 | 2-chloro-4-nitro-aniline | benzene ring with N(CH2-cyclohexyl)(C2H4COOH) and NHSO2CH3 | red |
| 23 | 5-amino-3-methoxy-carbonylethylthio-1,2,4-thiadiazole | " | " |
| 24 | 2,6-dichloro-4-nitroaniline | benzene ring with N(CH2CH2-cyclohexyl)(C2H4COOH) and NHSO2CH3 | brown |
| 25 | 4-amino-3-bromo-benzene-sulphon-methylamide | " | scarlet |
| 26 | 2-methylsulphonyl-4-nitroaniline | benzene ring with N(C4H9)(C2H4COOH) and NHSO2CH3 | bluish red |
| 27 | 5-amino-3-methyl-sulphonyl-1,2,4-thiadiazole | " | red |
| 28 | 3-methyl-4-nitro-5-amino-1,2-isothiazole | benzene ring with OCH3, NHC2H4COOH, and NHSO2CH3 | violet |
| 29 | 2-chloro-4,6-dinitroaniline | " | " |
| 30 | 2-amino-5-cyano-thiazole | benzene ring with OC2H5, NHC2H4COOH, and NHSO2CH3 | " |
| 31 | 2-amino-5-phenyl-1,3,4-thiadiazole | benzene ring with OCH3, N(C2H4CN)(C2H4COOH), and NHSO2C2H5 | red |
| 32 | 4-methylsulphonylaniline | benzene ring with OCH3, N(C2H4OH)(C2H4COOH), and NHSO2CH3 | red |

-continued

| I | II | III |
|---|---|---|
| 33 2-amino-5-nitro-thiazole | ![structure: cyclohexane with OCH₃, N(C₂H₅)(C₂H₄COOH), NHSO₂CH₃] | blue |
| 34 2-amino-5-acetyl-3-nitro-thiophene | " | " |
| 35 2,6-dicyano-4-nitro-aniline | " | " |
| 36 5-amino-3-methyl-pyrazole | " | yellow |
| 37 2-chloro-4-nitro-aniline | ![structure: cyclohexane with NHC₂H₄COOH, NHSO₂N(CH₃)(CH₃)] | red |
| 38 4-nitroaniline | ![structure: cyclohexane with Cl, NHC₂H₄COOH, NHSO₂N-piperidine] | scarlet |
| 39 2-amino-5-chloro-thiazole | ![structure: cyclohexane with OC₂H₅, NHC₂H₄COOH, NHSO₂N-morpholine] | violet |
| 40 2,6-dichloro-4-nitroaniline | ![structure: cyclohexane with NHC₂H₄COOH, NHSO₂CH₂Cl] | red |
| 41 2-cyano-4-chloro-aniline | ![structure: cyclohexane with CH₃, NHC₃H₆COOH, NHSO₂CH₃] | scarlet |

PRINTING EXAMPLE

133 Parts of a 10% paste of the dyestuff obtained according to Example 1, 200 parts of 2.5% sodium alginate solution and 1.5 parts by volume of 40% acetic acid are made up to 1000 parts with water and polyester fabric is padded with this liquor and squeezed out to 75% retention of liquid. The fabric is dried fo 1 minute at 120° C. and a portion of dried fabric is printed with white resist as follows: paste of 20 parts of sodium carbonate and 950 parts of 2.5% sodium alginate solution is printed on the fabric in stripes. The fabric is thermofixed directly fo 1 minute at 200° C. and subsequently thoroughly washed with a solution containing the adduct of 9 mols of ethylene oxide with 1 mol of nonylphenol. A fabric which is dyed red and with a white resist is obtained.

The printing paste may furthermore be treated with additives such as aluminium sec. butylate or m-nitrobenzenesulphonate.

DYEING EXAMPLE

1 Part of the dyestuff obtained according to Example 1 is ground wet with 2 parts of a 50% aqueous of the sodium salt of dinaphthylmethane-disulphonic acid.

This dyestuff preparation is stirred with 40 parts of a 10% aqueous solution of the sodium salt of N-benzyl-μ-heptadecyl-benzimidazole-disulphonic acid and 4 parts of a 40% acetic acid solution are added. A dyebath of 4000 parts by volume is prepared therefrom by dilution with water.

100 Parts of a purified polyester fibre material is put into this bath at 50° C., the temperature is raised within half an hour to 120°–130° C. and dyeing is carried out

I claim:

1. A dyestuff of the formula

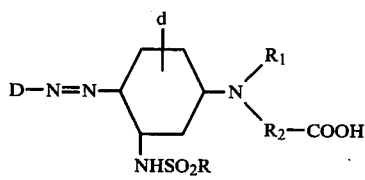

in which
- D is a diazo component radical selected from the group consisting of thiazolyl which is unsubstituted or substituted by chloro, bromo, nitro, cyano, thiocyano, lower alkyl, lower aralkyl, phenyl, lower cyanoalkyl, lower alkoxy, lower alkoxycarbonyl, trifluoromethyl, lower alkylcarbonyl or lower alkylsulfonyl; benzthiazole which is unsubstituted or substituted by chloro, bromo, cyano, thiocyano, lower alkyl, lower alkoxy, lower aralkoxy, phenyl, lower alkylmercapto, lower alkylsulfonyl, trifluoromethyl, nitro, cyanoethylsulfonyl, aminosulfonyl, monoalkylated aminosulfonyl, dialkylated aminosulfonyl, or lower alkoxycarbonyl; pyrazole which is unsubstituted or substituted by cyano, lower alkyl, lower alkoxy, lower alkoxycarbonyl or phenyl; thiadiazolyl which is unsubstituted or substituted by chloro, bromo, lower alkoxy, alkylmercapto, lower alkyl, lower alkylsulfonyl, phenyl, methylthiophenyl, nitrophenyl, tolyl, chlorophenyl or bromophenyl; imidazolyl which is unsubstituted or substituted by nitro or lower alkyl; thienyl which is unsubstituted or substituted by nitro, lower alkoxycarbonyl, lower alkyl, lower alkylsulfonyl, acetyl, aminosulfonyl or alkylated aminosulfonyl; isothiazolyl which is unsubstituted or substituted by alkyl, phenyl or cyano; benzisothiazolyl which is unsubstituted or substituted by lower alkyl, nitro, bromo or chloro; and pyridyl which is substituted by lower alkyl, cyano, bromo or chloro;
- d is hydrogen, chloro, lower alkyl, lower alkoxy, lower alkylmercapto, aryl, aryloxy or arylmercapto;
- $R_1$ is $C_1-C_5$ alkyl which is unsubstituted or substituted by chloro, bromo, hydroxy, phenoxy, phenyl, cyano, $C_1-C_4$-alkoxy, formylamino, $C_1-C_4$-alkylcarboxyloxy, $C_1-C_4$-alkylcarbamoyloxy, phenylcarbamoyloxy, $C_1-C_3$-alkoxycarbamoyloxy, benzoyloxy, phenoxycarbonyloxy or benzoyloxy;
- $R_2$ is straight or branched chain alkylene of 1 to 4 carbon atoms; and R is $C_1-C_5$ alkyl or a group of the formula

where $R_3$ and $R_4$ are $C_1-C_5$ alkyl, or $R_3$ and $R_4$ together with the nitrogen to which they are attached, represent morpholino or piperidino.

2. A azo dyestuff according to claim 1, which has the formula

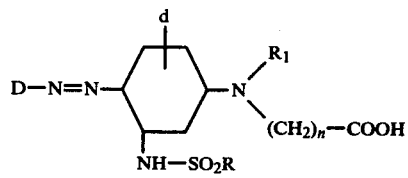

wherein n is at the most 3.

3. An azo dyestuff according to claim 2, which has formula

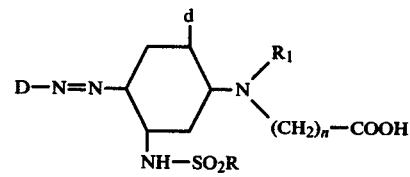

4. An azo dyestuff according to claim 1, wherein R is $C_1-C_5$-alkyl.

5. An azo dyestuff according to claim 1, wherein R is of the formula

in which $R_3$ and $R_4$ are $C_1-C_5$ alkyl or together with the nitrogen form morpholino or piperidino.

6. An azo dyestuff as claimed in claim 1, of the formula

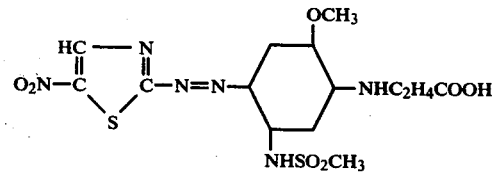

* * * * *